United States Patent [19]

Yamagishi

[11] Patent Number: 4,563,060

[45] Date of Patent: Jan. 7, 1986

[54] MICROSCOPE OBJECTIVE

[75] Inventor: Masaaki Yamagishi, Tokyo, Japan

[73] Assignee: Olympus Optical Co., Ltd., Tokyo, Japan

[21] Appl. No.: 627,294

[22] Filed: Jul. 2, 1984

[30] Foreign Application Priority Data

Jul. 6, 1983 [JP] Japan ................. 58-122550

[51] Int. Cl.[4] .................. G02B 9/62; G02B 21/02
[52] U.S. Cl. .................... 350/414; 350/464
[58] Field of Search .................. 350/414, 464

[56] References Cited

U.S. PATENT DOCUMENTS 4,231,637 11/1980 Sussman .................. 350/414

FOREIGN PATENT DOCUMENTS 52-128154 10/1977 Japan .

Primary Examiner—John K. Corbin
Assistant Examiner—Scott J. Sugarman
Attorney, Agent, or Firm—Cushman, Darby & Cushman

[57] ABSTRACT

A microscope objective comprising a first, second, third, fourth, fifth and sixth lens components wherein the first lens component is a positive meniscus lens concave toward the object side, the second lens component comprises a positive lens and has positive refractive power as a whole, the third lens component comprises a positive lens and has positive refractive power as a whole, the fourth lens component is a cemented negative meniscus lens convex toward the object side, the fifth lens component is a cemented negative meniscus lens convex toward the image side, and the sixth lens component is a cemented positive meniscus lens, the microscope objective being arranged that the working distance is very long, the image surface is flat, and aberrations are favorably corrected up to the marginal portion of field.

6 Claims, 8 Drawing Figures

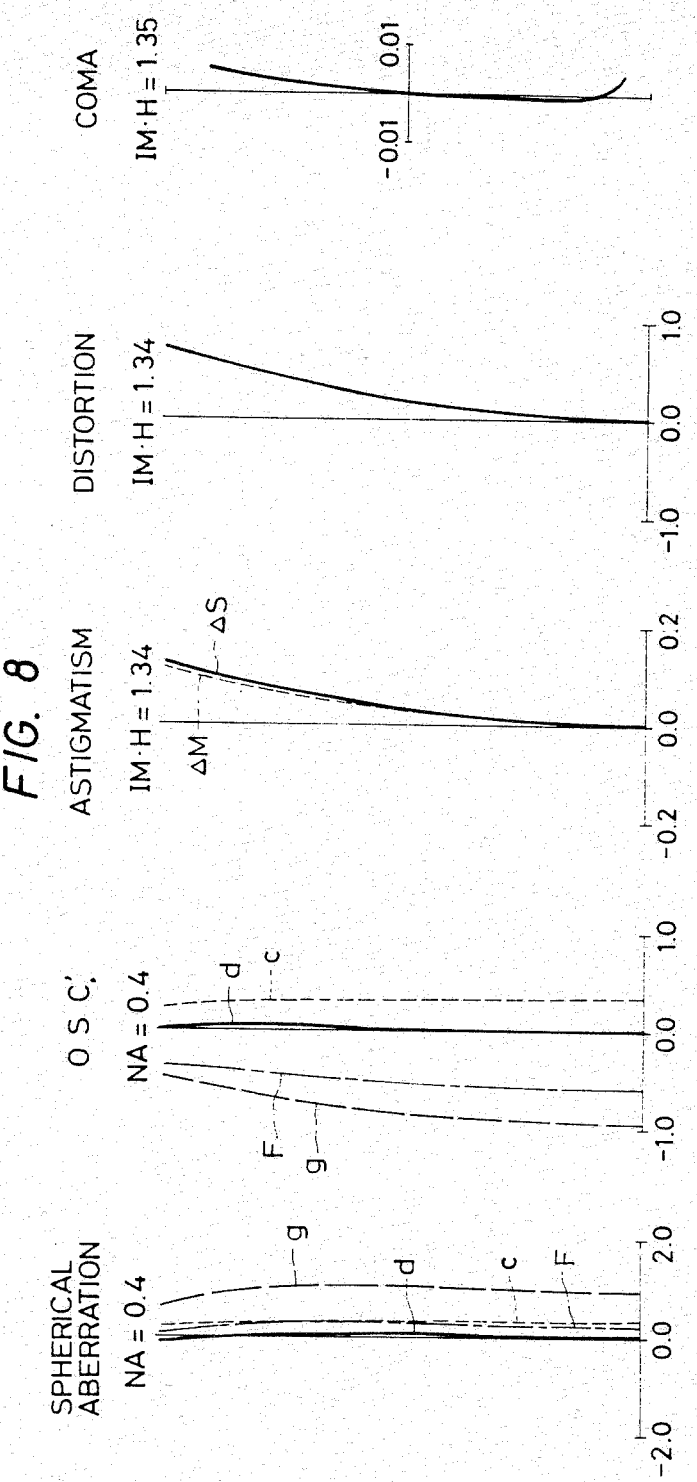

MICROSCOPE OBJECTIVE

BACKGROUND OF THE INVENTION (a) Field of the Invention

The present invention relates to a microscope objective and, more particularly, to a plan achromat class microscope objective with a medium class magnification of which the working distance is very long and aberrations are corrected favourably up to the marginal portion of field.

(b) Description of the Prior Art

Among known microscope objectives, the microscope objective disclosed in Japanese published unexamined patent application No. 128154/77, for example, is known as a microscope objective with a long working distance and NA about 0.4. However, most of such known microscope objectives do not have satisfactorily long working distance. On the other hand, there is a demand for a microscope objective with a long working distance from the view point of convenience in use.

Besides, regarding the microscope objective, there is such tendency that aberrations are aggravated sharply when the working distance is made long by keeping the same degree of NA and, as a result, it becomes difficult to obtain favourable quality of image.

SUMMARY OF THE INVENTION

It is, therefore, a primary object of the present invention to provide a microscope objective with a medium class magnification of which the working distance is very long, the image surface is flat and, at the same time, aberrations are corrected favourably up to the marginal portion of field.

The microscope objective according to the present invention comprises a first, second, third, fourth and sixth lens components wherein the first lens component is a positive meniscus lens which is concave toward the object side, the second lens component comprises a positive lens and has positive refractive power as a whole, the third lens component comprises a positive lens and has positive refractive power as a whole, the fourth lens component is a cemented negative meniscus lens which is convex toward the object side, the fifth lens component is a cemented negative meniscus lens which is convex toward the image side, and the sixth lens component is a cemented positive meniscus lens, the microscope objective being arranged to fulfill the conditions (1) through (7) shown below:

(1) $1.5f < |f_{IV-VI}| < 2.5f$, $f_{IV-VI} < 0$ (2) $|r_1| > 2.0f$, $r_1 < 0$ (3) $1.5 < r_1/r_2 < 2.5$ (4) $0.8f < |1/\phi_{10}| < 1.1f$, $\phi_{10} < 0$ (5) $\nu IV_p - \nu IV_n > 40$ (6) $\nu_{IIp}, \nu_{III} \geq 65$ (7) $0.5 < |f_V/f_{VI}| < 1.5$, $f_V/f_{VI} < 0$ where, reference symbols $r_1$ and $r_2$ respectively represent radii of curvature of the surface on the object side and surface on the image side of the first lens component, reference symbol f represent the focal length of the lens system as a whole, reference symbol $f_{IV-VI}$ represents the total focal length of the fourth, fifth and sixth lens components, reference symbol $\nu_{IVp}$ and $\nu_{IVn}$ respectively represent Abbe's numbers of the positive lens and negative lens constituting the fourth lens component, reference symbol $\nu_{IIp}$ represents Abbe's number of the positive lens constituting the second lens component, reference symbol $\nu_{IIIp}$ represents Abbe's number of the positive lens constituting the third lens component, reference symbol $f_V$ represents the focal length of the fifth lens component, reference symbol $f_{VI}$ represents the focal length of the sixth lens component, reference symbol $\phi_{10}$ represents refractive power of the surface on the image side of the fourth lens component and, when the refractive index of the lens on the image side in the fourth lens component is represented by reference symbol $n_6$ and the radius of curvature of the surface on the image side of the fourth lens component is represented by reference symbol $r_{10}$, $\phi_{10}$ becomes $\phi_{10} = (1 - n_6)/r_{10}$.

In case of a microscope objective having the above-mentioned lens configuration, it is possible to make the working distance very long when a lens with a considerably strong negative refractive power is provided on the image side. However, when such lens is provided, aberrations will be sharply aggravated and it is difficult to correct them.

The microscope objective according to the present invention is arranged to fulfill the above-mentioned conditions so as to make the working distance very long and, at the same time, to correct aberrations favourably up to the marginal portion of field.

Now, the above-mentioned conditions (1) through (7) are explained in the following.

The condition (1) defines the total focal length of the fourth, fifth and sixth lens components so as to obtain a microscope objective with a long working distance, which is an object of the present invention, by giving an adequate negative refractive power to the lens component arranged on the image side in the lens system.

If the value of $f_{IV-VI}$ becomes larger than the upper limit of the condition (1), the negative refractive power of the above-mentioned lens components as a whole becomes weak, and it is difficult to ensure a satisfactorily long working distance. If the value of $f_{IV-VI}$ becomes smaller than the lower limit of the condition (1), the negative refractive power of said lens components as a whole becomes too strong. As a result, the correction effect for Petzval's sum becomes too strong, and it is impossible to maintain the flatness of image surface.

The condition (2) is established so that the radius of curvature $r_1$ of the first surface of the lens system, i.e., the surface on the object side of the first lens component, is made large in order to thereby make the free working distance long. If the condition (2) is not fulfilled, the free working distance does not become proportionally long, even when the working distance is made long, and this is not desirable.

However, it is not enough even when the first surface fulfills the condition (2) only. That is, in that case, the first surface will not fulfill the aplanatic condition and, as a result, spherical aberration increases.

The condition (3) is established in order to correct the above-mentioned point and defines the ratio between the radius of curvature $r_1$ of the surface on the object side of the first lens component and radius of curvature $r_2$ of the surface on the image side of the first lens component. By the condition (3), the shape of the first lens component as a whole is made close to the aplanatic condition so that aberrations are thereby corrected favourably.

If the value of $r_1/r_2$ becomes smaller than the lower limit of the condition (3), spherical aberration to be caused by the surface on the object side of the first lens component becomes large and, when it is attempted to correct said spherical aberration by other surfaces, it becomes difficult to correct coma and curvature of field. If the value of $r_1/r_2$ becomes larger than the upper limit of the condition (3), spherical aberration to be caused by the surface on the image side of the first lens component becomes large and, when it is attempted to correct said spherical aberration by other surfaces, it becomes difficult to correct coma and curvature of field.

The condition (4) is established in order to correct spherical aberration more favourably. If the value defined by the condition (4) becomes larger than the upper limit thereof, spherical aberration will be undercorrected. When it is attempted to correct spherical aberration by other surfaces, coma and curvature of field will become unfavourable and it will be difficult to correct them. If the value defined by the condition (4) becomes smaller than the lower limit thereof, Petzval's sum becomes a negative value with a large absolute value and, therefore, curvature of field will be overcorrected.

The conditions (5) and (6) relate to correction of chromatic aberration. If the conditions (5) and/or (6) are not fulfilled, longitudinal chromatic aberration and/or lateral chromatic aberration will be undercorrected.

The condition (7) relates to correction of offaxial aberrations and, especially, correction of coma. If the condition (7) is not fulfilled, it is difficult to favourably correct coma, which is caused by the first through the fourth lens components, without losing symmetry of coma.

BRIEF DESCRIPTION OF THE DRAWINGS

FIG. 8 shows graphs illustrating aberration curves of Embodiment 1 when the thickness of cover glass is 2 mm (0.252 when f=1).

DETAILED DESCRIPTION OF THE PREFERRED EMBODIMENTS

Figure 1:
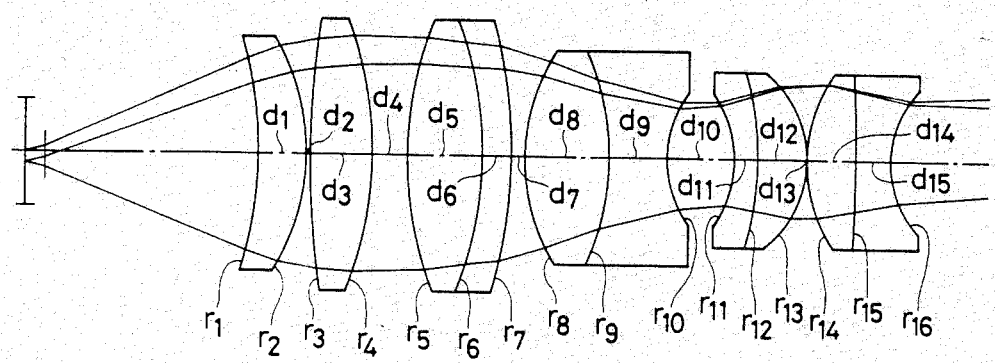
FIGS. 1 through 3 respectively show sectional views of Embodiments 1 through 3 of the microscope objective according to the present invention.

Now, preferred embodiments of the microscope objective according to the present invention are shown below.

Embodiment 1

$f = 1$, $NA = 0.4$, $\beta = -20X$, $WD = 1.421$
$|r_1/r_2| = 1.75$, $|f_{IV-VI}| = 1.71$,
$|1/\phi_{10}| = 0.91$, $|f_V/f_{VI}| = 1.08$ $r_1 = -2.4858$
  $d_1 = 0.315$     $n_1 = 1.77248$     $\nu_1 = 48.99$
$r_2 = -1.4178$
  $d_2 = 0.024$
$r_3 = 6.9456$
  $d_3 = 0.403$     $n_2 = 1.497$       $\nu_2 = 81.61$
$r_4 = -2.4991$
  $d_4 = 0.214$
$r_5 = 2.165$
  $d_5 = 0.491$     $n_3 = 1.497$       $\nu_3 = 81.61$
$r_6 = -2.6012$
  $d_6 = 0.189$     $n_4 = 1.6889$      $\nu_4 = 31.56$
$r_7 = -3.6045$
  $d_7 = 0.088$
$r_8 = 1.2709$
  $d_8 = 0.554$     $n_5 = 1.497$       $\nu_5 = 81.61$
$r_9 = -1.5431$
  $d_9 = 0.365$     $n_6 = 1.73997$     $\nu_6 = 28.75$
$r_{10} = 0.6749$
  $d_{10} = 0.44$
$r_{11} = -0.6617$
  $d_{11} = 0.151$  $n_7 = 1.73997$     $\nu_7 = 29.7$
$r_{12} = -1.9544$
  $d_{12} = 0.315$  $n_8 = 1.497$       $\nu_8 = 81.61$
$r_{13} = -0.7436$
  $d_{13} = 0.013$
$r_{14} = 1.0679$
  $d_{14} = 0.302$  $n_9 = 1.80514$     $\nu_9 = 25.15$
$r_{15} = -10.9735$
  $d_{15} = 0.239$  $n_{10} = 1.62094$  $\nu_{10} = 37.16$
$r_{16} = 0.7274$ thickness of cover glass = 0.126

Embodiment 2

$f = 1$, $NA = 0.4$, $\beta = -20X$, $WD = 1.4063$
$|r_1/r_2| = 2.12$, $|f_{IV-VI}| = 2.11$
$|1/\phi_{10}| = 0.92$, $|f_V/f_{VI}| = 1.09$ $r_1 = -2.7767$
  $d_1 = 0.3097$    $n_1 = 1.77249$     $\nu_1 = 51.26$
$r_2 = -1.3126$
  $d_2 = 0.013$
$r_3 = 5.6943$
  $d_3 = 0268$      $n_2 = 1.497$       $\nu_2 = 81.61$
$r_4 = -2.2326$
  $d_4 = 0.15$      $n_3 = 1.69894$     $\nu_3 = 30.68$
$r_5 = -2.7695$
  $d_5 = 0.213$
$r_6 = 3.2865$
  $d_6 = 0.549$     $n_4 = 1.497$       $\nu_4 = 81.61$
$r_7 = -4.6375$
  $d_7 = 0.092$
$r_8 = 1.1352$
  $d_8 = 0.556$     $n_5 = 1.497$       $\nu_5 = 81.61$
$r_9 = -1.8117$
  $d_9 = 0.376$     $n_6 = 1.73999$     $\nu_6 = 28.57$
$r_{10} = 0.6809$
  $d_{10} = 0.501$
$r_{11} = -0.7025$
  $d_{11} = 0.15$   $n_7 = 1.73999$     $\nu_7 = 28.62$
$r_{12} = -3.1853$
  $d_{12} = 0.314$  $n_8 = 1.497$       $\nu_8 = 81.61$
$r_{13} = -0.7399$
  $d_{13} = 0.116$
$r_{14} = 1.0891$
  $d_{14} = 0.303$  $n_9 = 1.80517$     $\nu_9 = 25.09$
$r_{15} = -6.4008$
  $d_{15} = 0.249$  $n_{10} = 1.62044$  $\nu_{10} = 36.64$
$r_{16} = 0.7232$ thickness of cover glass = 0.125

Embodiment 3

$f = 1$, $NA = 0.4$, $\beta = -20X$, $WD = 1.428$
$|r_1/r_2| = 1.89$, $|f_{IV-VI}| = 1.8$
$|1/\phi_{10}| = 0.94$, $|f_V/f_{VI}| = 0.73$ $r_1 = -2.7974$
  $d_1 = 0.315$     $n_1 = 1.77247$     $\nu_1 = 46.48$
$r_2 = -1.4819$
  $d_2 = 0.024$
$r_3 = 5.8565$
  $d_3 = 0.422$     $n_2 = 1.497$       $\nu_2 = 81.61$
$r_4 = -2.6115$
  $d_4 = 0.218$
$r_5 = 2.6336$
  $d_5 = 0.492$     $n_3 = 1.497$       $\nu_3 = 81.61$
$r_6 = -1.8048$
  $d_6 = 0.212$     $n_4 = 1.68889$     $\nu_4 = 34.73$
$r_7 = -2.8439$
  $d_7 = 0.088$ -continued

| | | |
|---|---|---|
| $r_8 = 1.203$ | | |
| $d_8 = 0.555$ | $n_5 = 1.497$ | $v_5 = 81.61$ |
| $r_9 = -1.7686$ | | |
| $d_9 = 0.366$ | $n_6 = 1.73995$ | $v_6 = 29.78$ |
| $r_{10} = 0.6965$ | | |
| $d_{10} = 0.442$ | | |
| $r_{11} = -0.6562$ | | |
| $d_{11} = 0.151$ | $n_7 = 1.73995$ | $v_7 = 30.92$ |
| $r_{12} = 3.1312$ | | |
| $d_{12} = 0.315$ | $n_8 = 1.497$ | $v_8 = 81.61$ |
| $r_{13} = -0.7463$ | | |
| $d_{13} = 0.013$ | | |
| $r_{14} = 1.1743$ | | |
| $d_{14} = 0.302$ | $n_9 = 1.80511$ | $v_9 = 25.03$ |
| $r_{15} = -3.6354$ | | |
| $d_{15} = 0.239$ | $n_{10} = 1.62093$ | $v_{10} = 37.93$ |
| $r_{16} = 0.7907$ | | |
| thickness of cover glass = 0.126 | | | thickness of cover glass=0.126

In embodiments shown in the above, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_{10}$ respectively represent refractive indices of respective lenses, and reference symbols $v_1$ through $v_{10}$ respectively represent Abbe's numbers of respective lenses.

Out of respective embodiments shown in the above, Embodiment 1 has the lens configuration as shown in FIG. 1. In case of Embodiment 1, it is possible to prevent aberrations from becoming unfavourable, even when cover glasses with different thicknesses are used, by moving the third lens component along the optical axis and thereby varying the airspaces ($d_4$ and $d_7$) in front and rear of the third lens component.

Figure 7:
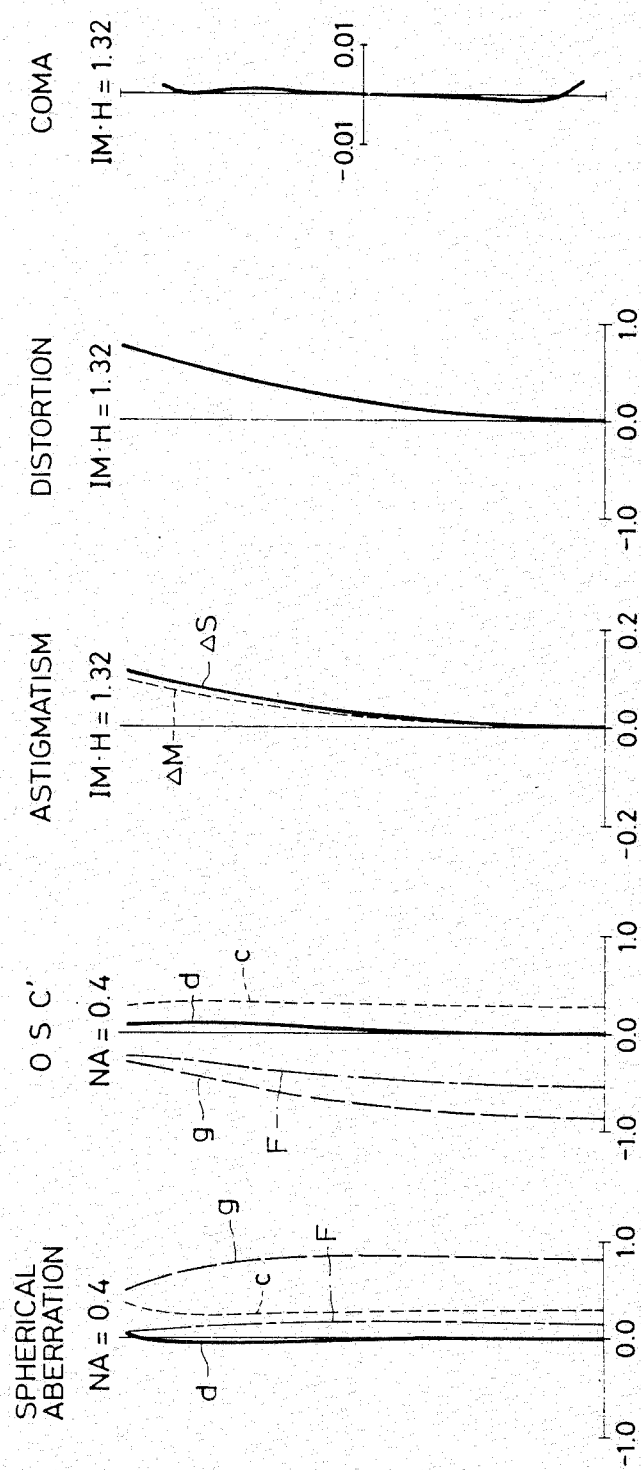
FIG. 7 shows graphs illustrating aberration curves of Embodiment 1 when the thickness of cover glass is 0 mm (0 when f=1)

For example, when the thickness of cover glass is 0 mm (when a cover glass is not used), it is possible to prevent aberrations from becoming unfavourable by making said airspaces as $d_4=0.235$ and $d_7=0.067$. The state of aberrations at that time are as shown in FIG. 7. When the thickness of cover glass is 2 mm (0.252 when $f=1$), it is possible to prevent aberrations from becoming unfavourable by making said airspaces as $d_4=0.192$ and $d_7=0.11$. The state of aberrations at that time are as shown in FIG. 8.

Figure 2:
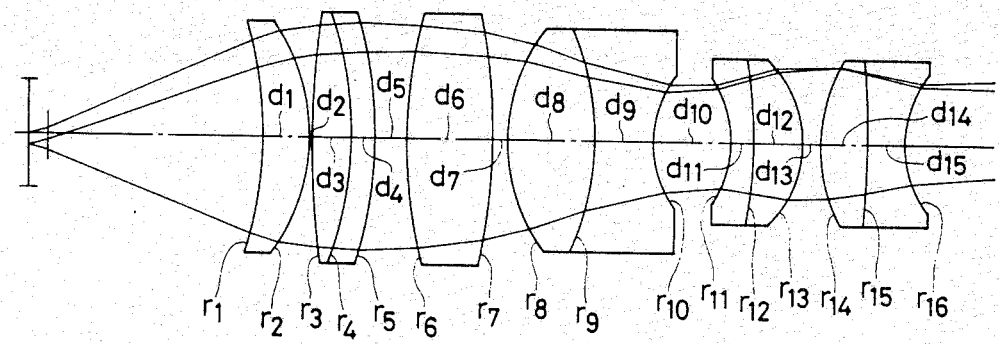
Figure 3:
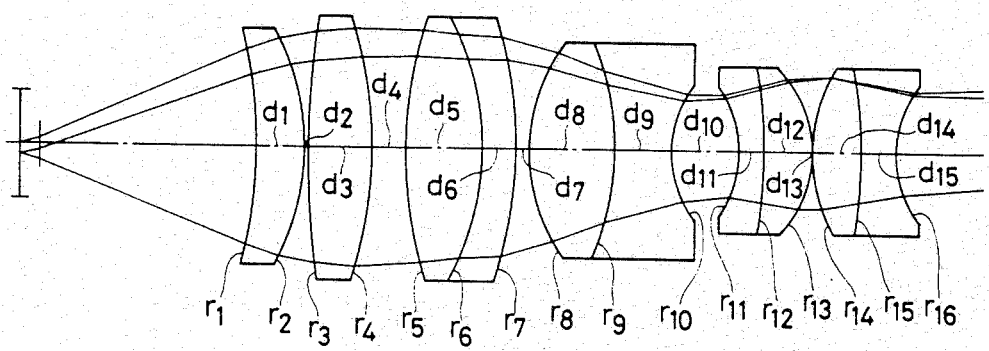

Embodiments 2 and 3 respectively have the lens configurations as shown in FIGS. 2 and 3. In cases of these embodiments, it is also possible to prevent aggravation of aberrations to be caused by variation in the thickness of cover glass by varying the airspaces in front and rear of the third lens component ($d_5$ and $d_7$ in case of Embodiment 2 and $d_4$ and $d_7$ in case of Embodiment 3) in the same way as the case of Embodiment 1.

Figure 4:
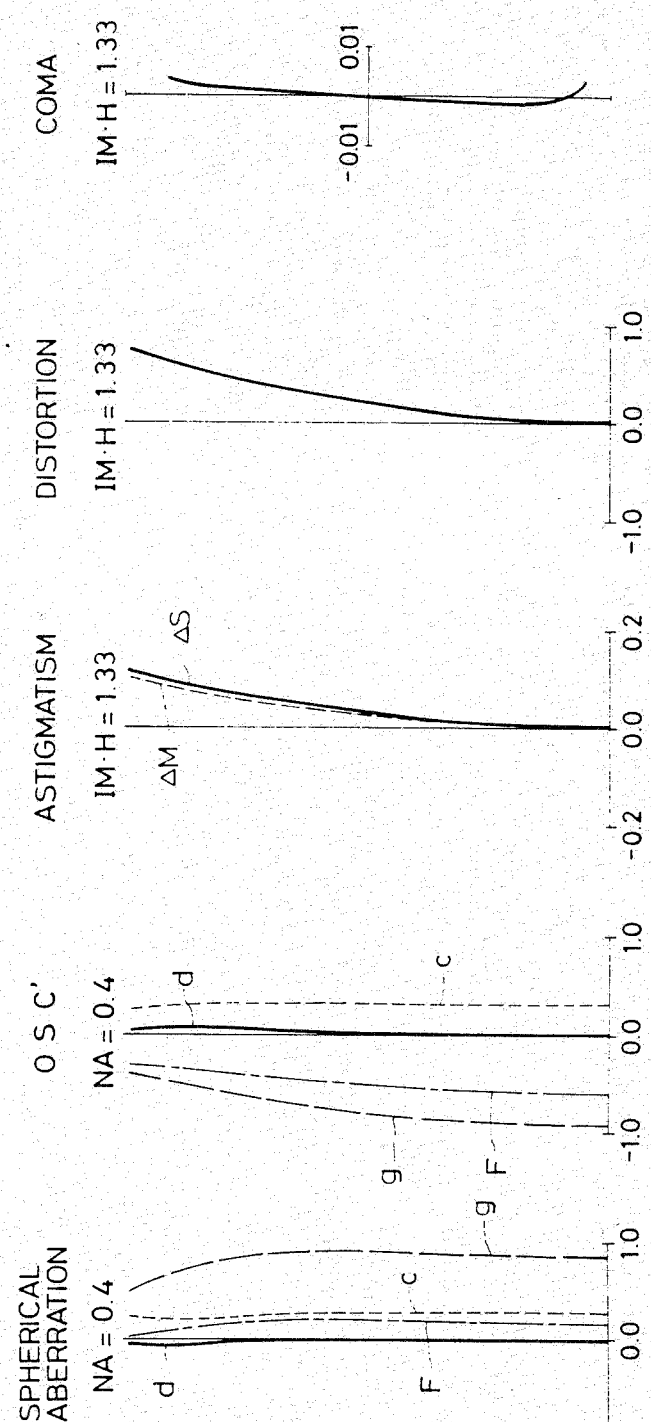
FIGS. 4 through 6 respectively show graphs illustrating aberration curves of Embodiments 1 through 3 of the present invention.
Figure 5:
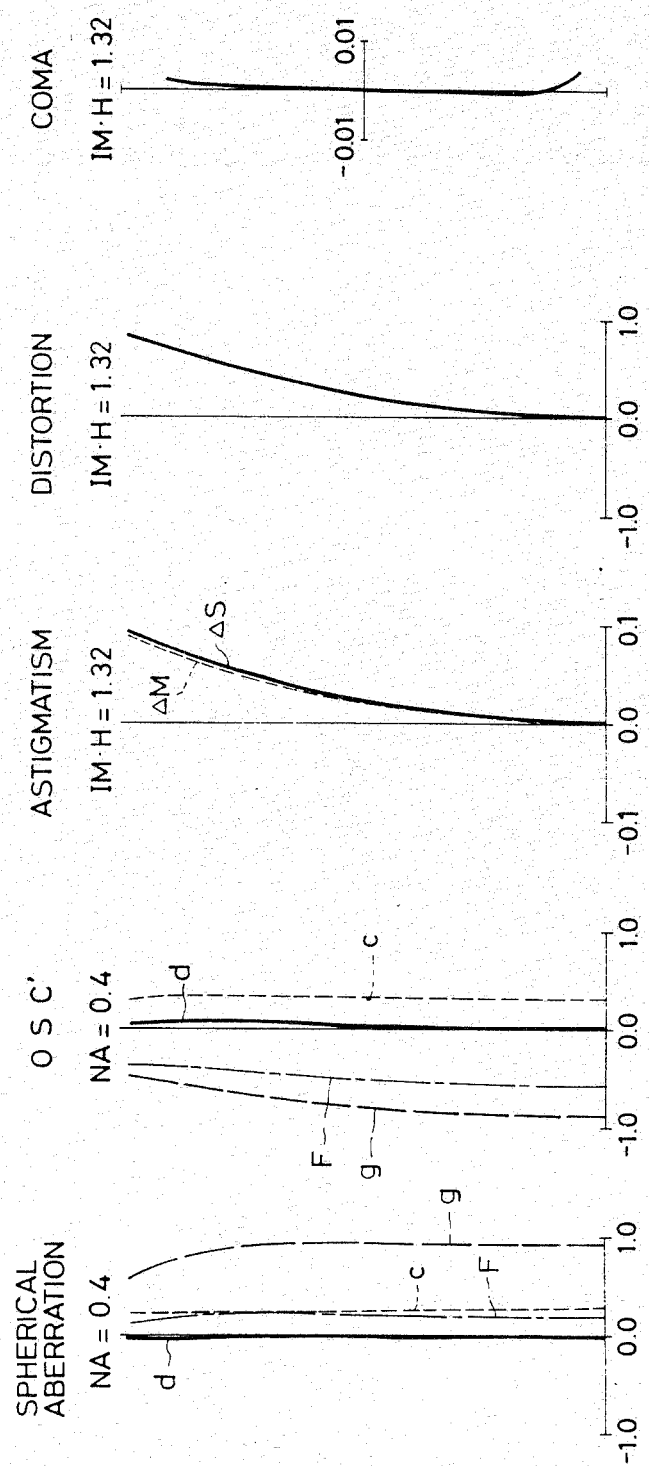
Figure 6:
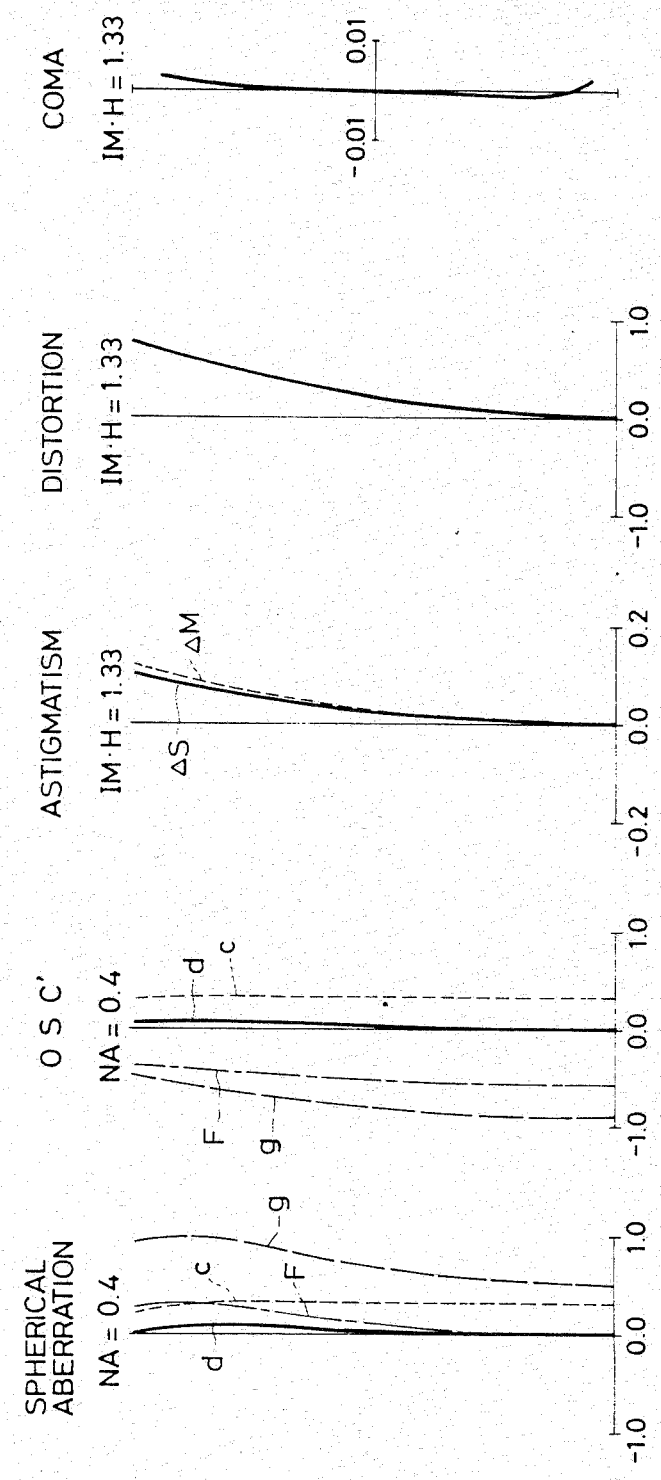

The working distance of the microscope objective according to the present invention is 1.42 in case of Embodiment 1, 1.41 in case of Embodiment 2 and 1.43 in case of Embodiment 3. Compared with known microscope objectives with NA about 0.4 and long working distance (about 0.76 in case of microscope objective disclosed in Japanese published unexamined patent application No. 128154/77), the working distance of the microscope objective according to the present invention is remarkably long. Moreover, as it is evident from graphs of aberration curves shown in FIGS. 4 through 6, aberrations are corrected favourably up to the marginal portion of field in case of the microscope objective according to the present invention and, therefore, the quality of image is excellent.

I claim:

1. A microscope objective comprising a first, second, third, fourth, fifth and sixth lens components wherein said first lens component is a positive meniscus lens concave toward the object side, said second lens component comprises a positive lens component, said third lens component comprises a positive lens component, said fourth lens component is a cemented negative meniscus lens convex toward the object side, said fifth lens component is a cemented negative meniscus lens convex toward the image side, and said sixth lens component is a cemented positive meniscus lens concave toward the image side and said microscope objective fulfills the following conditions:

(1) $1.5f<|f_{IV-VI}|<2.5$, $f_{IV-VI}<0$ (2) $|r_1|>2.0f$, $r_1<0$ (3) $1.5<r_1/r_2<2.5$ (4) $0.8f<|1/\phi_{10}|<1.1f$, $\phi_{10}<0$ (7) $0.5<|f_V/f_{VI}|<1.5$, $f_V/f_{VI}<0$ where, reference symbols $r_1$ and $r_2$ respectively represent radii of curvature of the surface on the object side and surface on the image side of the first lens component, reference symbol $f$ represents the focal length of the lens system as a whole, reference symbol $f_{IV-VI}$ represents the total focal length of the fourth, fifth and sixth lens components, reference symbol $f_V$ represents the focal length of the fifth lens component, reference symbol $f_{VI}$ represents the focal length of the sixth lens component, and reference symbol $\phi_{10}$ represents refractive power of the surface on the image side of the fourth lens component.

2. A microscope objective according to claim 1 which fulfills the following conditions:

(5) $v_{IVp}-v_{IVn}>40$ (6) $v_{IIp}$, $v_{IIIp} \geq 65$ where, reference symbols $v_{IVp}$ and $v_{IVn}$ respectively represent Abbe's numbers of the positive lens and negative lens constituting the fourth lens component, reference symbol $v_{IIp}$ represents Abbe's number of the positive lens constituting the second lens component, reference symbol $v_{IIIp}$ represents Abbe's number of the positive lens constituting the third lens component.

3. A microscope objective according to claim 1 arranged to vary the airspace in front and rear of said third lens component and to thereby prevent aberrations from becoming unfavourable when cover glasses with different thicknesses are used.

4. A microscope objective according to claim 1 wherein said second lens component is arranged as a positive single lens and said third lens component is arranged as a positive cemented doublet consisting of a positive lens and negative lens and where said microscope objective has the following numerical data:

$f = 1$, NA $= 0.4$, $\beta = -20X$, WD $= 1.421$
$|r_1/r_2| = 1.75$, $|f_{IV-VI}| = 1.71$
$|1/\phi_{10}| = 0.91$, $|f_V/f_{VI}| = 1.08$
$r_1 = -2.4858$ -continued

| | | |
|---|---|---|
| $d_1 = 0.315$ | $n_1 = 1.77248$ | $\nu_1 = 48.99$ |
| $r_2 = -1.4178$ | | |
| $d_2 = 0.024$ | | |
| $r_3 = 6.9456$ | | |
| $d_3 = 0.403$ | $n_2 = 1.497$ | $\nu_2 = 81.61$ |
| $r_4 = -2.4991$ | | |
| $d_4 = 0.214$ | | |
| $r_5 = 2.165$ | | |
| $d_5 = 0.491$ | $n_3 = 1.497$ | $\nu_3 = 81.61$ |
| $r_6 = -2.6012$ | | |
| $d_6 = 0.189$ | $n_4 = 1.6889$ | $\nu_4 = 31.56$ |
| $r_7 = -3.6045$ | | |
| $d_7 = 0.088$ | | |
| $r_8 = 1.2709$ | | |
| $d_8 = 0.554$ | $n_5 = 1.497$ | $\nu_5 = 81.61$ |
| $r_9 = -1.5431$ | | |
| $d_9 = 0.365$ | $n_6 = 1.73997$ | $\nu_6 = 28.75$ |
| $r_{10} = 0.6749$ | | |
| $d_{10} = 0.44$ | | |
| $r_{11} = -0.6617$ | | |
| $d_{11} = 0.151$ | $n_7 = 1.73997$ | $\nu_7 = 29.7$ |
| $r_{12} = -1.9544$ | | |
| $d_{12} = 0.315$ | $n_8 = 1.497$ | $\nu_8 = 81.61$ |
| $r_{13} = -0.7436$ | | |
| $d_{13} = 0.013$ | | |
| $r_{14} = 1.0679$ | | |
| $d_{14} = 0.302$ | $n_9 = 1.80514$ | $\nu_9 = 25.15$ |
| $r_{15} = -10.9735$ | | |
| $d_{15} = 0.239$ | $n_{10} = 1.62094$ | $\nu_{10} = 37.16$ |
| $r_{16} = 0.7274$ | | |
| thickness of cover glass = 0.126 | | | where, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_{10}$ respectively represent refractive indices of respective lenses, and reference symbols $\nu_1$ through $\nu_{10}$ respectively represent Abbe's numbers of respective lenses.

5. A microscope objective according to claim 1 wherein said second lens component is arranged as a positive cemented doublet consisting of a positive lens and a negative lens and said third lens component is arranged as a positive signal lens and wherein said microscope objective has the following numerical data:

| | | |
|---|---|---|
| $f = 1$, NA = 0.4, $\beta = -20X$, WD = 1.4063 | | |
| $\|r_1/r_2\| = 2.12$, $\|f_{IV-VI}\| = 2.11$ | | |
| $\|1/\phi_{10}\| = 0.92$, $\|f_V/f_{VI}\| = 1.09$ | | |
| $r_1 = -2.7767$ | | |
| $d_1 = 0.3097$ | $n_1 = 1.77249$ | $\nu_1 = 51.26$ |
| $r_2 = -1.3126$ | | |
| $d_2 = 0.013$ | | |
| $r_3 = 5.6943$ | | |
| $d_3 = 0.268$ | $n_2 = 1.497$ | $\nu_2 = 81.61$ |
| $r_4 = -2.2326$ | | |
| $d_4 = 0.15$ | $n_3 = 1.69894$ | $\nu_3 = 30.68$ |
| $r_5 = -2.7695$ | | |
| $d_5 = 0.213$ | | |
| $r_6 = 3.2865$ | | |
| $d_6 = 0.549$ | $n_4 = 1.497$ | $\nu_4 = 81.61$ |
| $r_7 = -4.6375$ | | |
| $d_7 = 0.092$ | | |
| $r_8 = 1.1352$ | | |
| $d_8 = 0.556$ | $n_5 = 1.497$ | $\nu_5 = 81.61$ |
| $r_9 = -1.8117$ | | |
| $d_9 = 0.376$ | $n_6 = 1.73999$ | $\nu_6 = 28.57$ |
| $r_{10} = 0.6809$ | | |
| $d_{10} = 0.501$ | | |
| $r_{11} = -0.7025$ | | |
| $d_{11} = 0.15$ | $n_7 = 1.73999$ | $\nu_7 = 28.62$ |
| $r_{12} = -3.1853$ | | |
| $d_{12} = 0.314$ | $n_8 = 1.497$ | $\nu_8 = 81.61$ |
| $r_{13} = -0.7399$ | | |
| $d_{13} = 0.116$ | | |
| $r_{14} = 1.0891$ | | |
| $d_{14} = 0.303$ | $n_9 = 1.80517$ | $\nu_9 = 25.09$ |
| $r_{15} = -6.4008$ | | |
| $d_{15} = 0.249$ | $n_{10} = 1.62044$ | $\nu_{10} = 36.64$ |
| $r_{16} = 0.7232$ | | |
| thickness of cover glass = 0.125 | | | thickness of cover glass = 0.125 where, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_{10}$ respectively represent refractive indices of respective lenses, and reference symbols $\nu_1$ through $\nu_{10}$ respectively represent Abbe's numbers of respective lenses.

6. A microscope objective according to claim 1 wherein said second lens component is arranged as a positive single lens and said third lens component is arranged as a positive cemented doublet consisting of a positive lens and a negative lens and wherein said microscope objective has the following numerical data:

| | | |
|---|---|---|
| $f = 1$, NA = 0.4, $\beta = -20X$, WD = 1.428 | | |
| $\|r_1/r_2\| = 1.89$, $\|f_{IV-VI}\| = 1.8$ | | |
| $\|1/\phi_{10}\| = 0.94$, $\|f_V/f_{VI}\| = 0.73$ | | |
| $r_1 = -2.7974$ | | |
| $d_1 = 0.315$ | $n_1 = 1.77247$ | $\nu_1 = 46.48$ |
| $r_2 = -1.4819$ | | |
| $d_2 = 0.024$ | | |
| $r_3 = 5.8565$ | | |
| $d_3 = 0.422$ | $n_2 = 1.497$ | $\nu_2 = 81.61$ |
| $r_4 = -2.6115$ | | |
| $d_4 = 0.218$ | | |
| $r_5 = 2.6336$ | | |
| $d_5 = 0.492$ | $n_3 = 1.497$ | $\nu_3 = 81.61$ |
| $r_6 = -1.8048$ | | |
| $d_6 = 0.212$ | $n_4 = 1.68889$ | $\nu_4 = 34.73$ |
| $r_7 = -2.8439$ | | |
| $d_7 = 0.088$ | | |
| $r_8 = 1.203$ | | |
| $d_8 = 0.555$ | $n_5 = 1.497$ | $\nu_5 = 81.61$ |
| $r_9 = -1.7686$ | | |
| $d_9 = 0.366$ | $n_6 = 1.73995$ | $\nu_6 = 29.78$ |
| $r_{10} = 0.6965$ | | |
| $d_{10} = 0.442$ | | |
| $r_{11} = -0.6562$ | | |
| $d_{11} = 0.151$ | $n_7 = 1.73995$ | $\nu_7 = 30.92$ |
| $r_{12} = -3.1312$ | | |
| $d_{12} = 0.315$ | $n_8 = 1.497$ | $\nu_8 = 81.61$ |
| $r_{13} = -0.7463$ | | |
| $d_{13} = 0.013$ | | |
| $r_{14} = 1.1743$ | | |
| $d_{14} = 0.302$ | $n_9 = 1.80511$ | $\nu_9 = 25.03$ |
| $r_{15} = -3.6354$ | | |
| $d_{15} = 0.239$ | $n_{10} = 1.62093$ | $\nu_{10} = 37.93$ |
| $r_{16} = 0.7907$ | | |
| thickness of cover glass = 0.126 | | | where, reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_{10}$ respectively represent refractive indices of respective lenses, and reference symbols $\nu_1$ through $\nu_{10}$ respectively represent Abbe's numbers of respective lenses.

* * * * *